(12) United States Patent
Prissok et al.

(10) Patent No.: US 8,927,613 B2
(45) Date of Patent: Jan. 6, 2015

(54) CELLULAR ELASTOMER WITH LITTLE TENDENCY TOWARD CREEP AT HIGH TEMPERATURES

(75) Inventors: Frank Prissok, Lemfoerde (DE); Joern Duwenhorst, Lemfoerde (DE); Michael Harms, Diepholz (DE); Sven Lasai, Stemshorn (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/054,214

(22) PCT Filed: Jul. 14, 2009

(86) PCT No.: PCT/EP2009/058941
§ 371 (c)(1),
(2), (4) Date: Jan. 14, 2011

(87) PCT Pub. No.: WO2010/010002
PCT Pub. Date: Jan. 28, 2010

(65) Prior Publication Data
US 2011/0118373 A1 May 19, 2011

(30) Foreign Application Priority Data
Jul. 25, 2008 (EP) .................................. 08161203

(51) Int. Cl.
  C08G 18/00 (2006.01)
  C08G 18/48 (2006.01)
  C08G 18/10 (2006.01)
  C08G 18/72 (2006.01)
  C08G 18/76 (2006.01)

(52) U.S. Cl.
  CPC ............ *C08G 18/4812* (2013.01); *C08G 18/10* (2013.01); *C08G 18/4854* (2013.01); *C08G 18/725* (2013.01); *C08G 18/7678* (2013.01)
  USPC ............ 521/174; 521/155; 521/159; 521/170

(58) Field of Classification Search
  USPC .......................................... 521/155, 170, 174
  See application file for complete search history.

(56) References Cited

U.S. PATENT DOCUMENTS

| 5,556,925 A * | 9/1996 | Kousaka et al. ............... 523/161 |
| 5,686,042 A * | 11/1997 | Slack et al. ................. 264/328.6 |
| 6,255,431 B1 * | 7/2001 | Fishback et al. ................. 528/44 |
| 6,570,041 B1 | 5/2003 | Kodama et al. |
| 6,624,281 B1 * | 9/2003 | Lawrey ............................ 528/61 |
| 6,642,343 B2 * | 11/2003 | Gilles et al. ...................... 528/61 |
| 7,067,607 B2 * | 6/2006 | Eugene ............................ 528/76 |
| 2005/0272828 A1 | 12/2005 | Fujiwara |
| 2006/0057291 A1 * | 3/2006 | Duris et al. ................. 427/372.2 |
| 2008/0161440 A1 | 7/2008 | Marten et al. |

FOREIGN PATENT DOCUMENTS

| DE | 38 05 106 | 8/1989 |
| EP | 0 850 260 | 7/1998 |
| EP | 0 854 889 | 7/1998 |
| EP | 1 873 178 | 1/2008 |
| JP | 2005-97325 A | 4/2005 |
| WO | 01 18086 | 3/2001 |
| WO | 2006 094998 | 9/2006 |
| WO | 2007 068628 | 6/2007 |

OTHER PUBLICATIONS

International Search Report issued Nov. 6, 2009 in PCT/EP09/058941 filed Jul. 14, 2009.

\* cited by examiner

*Primary Examiner* — Melissa Rioja
(74) *Attorney, Agent, or Firm* — Oblon, Spivak, McClelland, Maier & Neustadt, L.L.P.

(57) ABSTRACT

The present invention relates to cellular polyisocyanate polyaddition products whose density to DIN EN ISO 845 is from 200 to 800 kg/m$^3$, and also to prepolymer composed of at least one diisocyanate (a) and of at least one polyether alcohol (b), where the at least one polyether alcohol (b) comprises the following components:
(b1) aliphatic polyether alcohols whose number-average molar mass is from 300 to 1000 g/mol,
(b2) aliphatic polyether alcohols whose number-average molar mass is from 2000 to 10 000 g/mol, and
(b3) aliphatic polyether alcohols whose number-average molar mass is from 10 000 to 100 000 g/mol,
to a process for its production, to a cellular polyisocyanate polyaddition product thus produced, and to its use as damping elements in vehicle construction.

18 Claims, 1 Drawing Sheet

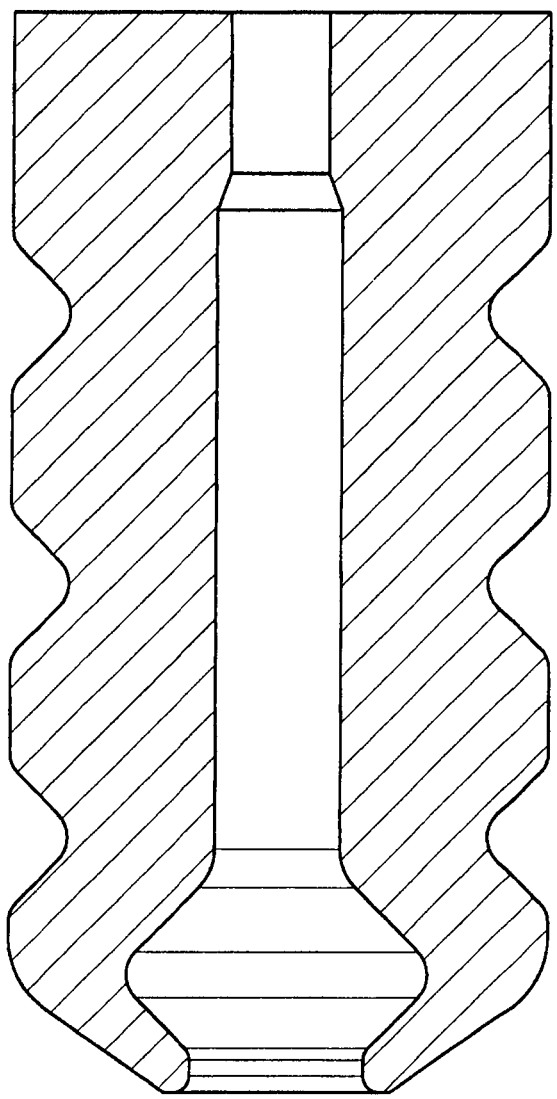

CELLULAR ELASTOMER WITH LITTLE TENDENCY TOWARD CREEP AT HIGH TEMPERATURES

CROSS REFERENCE TO RELATED APPLICATION

This application is a 371 of PCT/EP09/058941, filed on Jul. 14, 2009, and claims priority to European Patent Application No. 08161203.8, filed on Jul. 25, 2008.

The present invention relates to a cellular polyisocyanate polyaddition product whose density to DIN EN ISO 845 is from 200 to 800 kg/m$^3$. The invention further relates to prepolymer based on the reaction of at least one diisocyanate (a) and of at least one polyether alcohol (b), where the polyether alcohol (b) comprises the following components:
- (b1) aliphatic polyether alcohols whose number-average molar mass is from 300 to 1000 g/mol,
- (b2) aliphatic polyether alcohols whose number-average molar mass is from 2000 to 10 000 g/mol, and
- (b3) aliphatic polyether alcohols whose number-average molar mass is from 10 000 to 100 000 g/mol.

The present invention further relates to processes for the production of a cellular polyisocyanate polyaddition product from said prepolymer, and also to this cellular polyisocyanate polyaddition product and to its use in the automobile sector.

Cellular, for example microcellular, polyisocyanate polyaddition products are well known, and these are usually polyurethanes and/or polyisocyanurates, which may, if appropriate, comprise urea structures, and which are obtainable via reaction of isocyanates with compounds reactive toward isocyanates. Processes for their production are also well known. One particular embodiment of these products is provided by cellular, in particular microcellular, polyurethane elastomers which differ from conventional polyurethane foams by virtue of their substantially higher density, usually from 200 to 800 kg/m$^3$, and their particular physical properties, and the applications in which they can therefore be used. These polyurethane elastomers are used by way of example as vibration-damping and shock-absorbing elements, in particular in automobile construction. Springing elements produced from polyurethane elastomers are used in automobiles by way of example within the overall design of the spring strut, composed of shock absorber, spiral spring, and elastomer spring, into which the piston rod of the shock absorber is inserted.

Products whose production uses a prepolymer having low NCO content ("full prepolymer") feature urea hard phases relatively resistant to temperature variation. In particular under high dynamic loading, i.e. large force and/or high frequency, elevated temperatures above 80° C. are produced within the springs. Springs with a urea hard phase have better dynamic performance here when compared with products which have a urethane hard phase that are based on prepolymers having high NCO content, for example from 14 to 20% ("semiprepolymer"). Urea hard phases in cellular elastomers are usually formed via the reaction of water with isocyanate. The carbamic acid formed decomposes to give carbon dioxide and amine, which reacts with isocyanate to form urea.

Polyesterol-containing soft phases lead to the highest level of dynamic properties in cellular PU elastomers having a urea hard phase. Products of this type are well known.

WO 2001018086 A1 describes the use of polyester polyetherol obtainable via polycondensation of polyoxytetramethylene glycol whose average molar mass is from 220 to 270 g/mol and adipic acid, for the production of cellular polyurethane elastomers with good dynamic properties and with high low-temperature flexibility. However, the ester bonds make the resultant foam susceptible to hydrolysis.

DE-A 3613964 describes the production of products based on pure polyester soft phases and, respectively, polyester-polyetherol soft phases. The test specimens based on polytetrahydrofuran (M=2000 g/mol) as soft phase in the comparative example in DE-A 3613964 had only comparatively low flexural strength.

A disadvantage of the polyurethane elastomers known in the prior art is that they have only limited usefulness above 120° C. These cellular polyurethane elastomers do not retain the desired shape if the polyurethane elastomer is subject not only to an increased temperature but also to contact with moisture and/or to high pressure acting on the elastomer.

It is an object of the present invention to provide cellular polyisocyanate polyaddition products, preferably cellular polyurethane elastomers, which are dimensionally stable even at high temperatures, and preferably also in the presence of moisture and/or at high pressures, thus permitting their use in the direct vicinity of the engine, transmission system, or exhaust system. The intention is moreover that the polyisocyanate polyaddition products at the same time have at least the same advantageous properties in relation to longlasting elasticity, abrasion resistance, tensile strength, tear-propagation resistance, and compression set values as the elastomers of the prior art. The polyisocyanate polyaddition products are intended to be inexpensive and to have very good microbial resistance, and also hydrolysis resistance. The cellular polyisocyanate polyaddition products were moreover intended to have low water absorption, and good low-temperature flexibility. A further object is to provide a prepolymer which can be used to produce the desired polyisocyanate polyaddition products.

The invention achieves these objects via cellular polyisocyanate polyaddition products, preferably damping elements, particularly preferably engine mountings, transmission mountings, and/or exhaust mountings, in particular engine mountings and transmission mountings, with density to DIN EN ISO 845 of from 200 to 800 kg/m$^3$, where the cellular polyisocyanate polyaddition product comprises the reaction product of (a) isocyanate with (b) polyether alcohol whose number-average molar mass is from 10 000 to 100 000 g/mol. It is preferable here that the proportion by weight of the polyether alcohol whose number-average molar mass is from 10 000 to 100 000 g/mol present in the cellular polyisocyanate polyaddition product is at least 4% by weight, based on the total weight of the cellular polyisocyanate polyaddition product, where this weight of the polyether alcohol is based on the weight of the polyether alcohol whose number-average molar mass is from 10 000 to 100 000 g/mol and which is used for the production of the cellular polyisocyanate polyaddition product.

Particular preference is given to cellular polyisocyanate polyaddition products which comprise the reaction product of (a) isocyanate with
- (b1) preferably aliphatic polyether alcohols whose number-average molar mass is from 300 to 1000 g/mol,
- (b2) preferably aliphatic polyether alcohols whose number-average molar mass is from 2000 to 10 000 g/mol, and
- (b3) preferably aliphatic polyether alcohol whose number-average molar mass is from 10 000 to 100 000 g/mol.

A feature of the cellular elastomer of the invention is that by virtue of the high-molecular-weight polyether, preferably by virtue of the polyether alcohol (b), which features a specific, and particularly a broad, molecular weight distribution, it features low tendency toward creep at high temperatures of up to 150° C., improved low-temperature flexibility, excellent hydrolysis resistance, and good mechanical and dynamic properties.

It is preferable that the (b) polyether alcohol whose number-average molar mass is from 10 000 to 100 000 g/mol is polytetrahydrofuran.

It is particularly preferable that the aliphatic polyether alcohol (b1), (b2), and/or (b3) is polytetrahydrofuran.

It is preferable that the isocyanate (a) has been selected from the group consisting of diphenylmethane 2,2'-diisocyanate, diphenylmethane 4,4'-diisocyanate (MDI), naphthylene 1,5-diisocyanate (NDI), tolidine diisocyanate (TODI), and mixtures thereof.

The cellular polyisocyanate polyaddition products of the invention, preferably the cellular polyurethanes, are preferably those whose glass transition temperature is below −50° C., whose tensile strength to DIN EN ISO 1798 is >2 N/mm, preferably >4 N/mm$^2$, whose tensile strain at break to DIN EN ISO 1798 is ≤200%, preferably ≥230%, and whose tear-propagation resistance to DIN ISO 34-1B(b) is ≤6 N/mm, preferably ≥10 N/mm, and particularly preferably whose compression set (at 80° C.) by a method based on DIN 53572 is smaller than 25%.

It is preferable that the cellular polyisocyanate polyaddition product of the invention exhibits creep of less than 10%, particularly preferably less than 7%, very particularly preferably less than 5%, when kept for 24 h at 150° C., using a test load of 2 kg/cm$^2$.

It is particularly preferable that the water absorption of the cellular polyisocyanate polyaddition products, preferably of the cellular polyurethanes, is smaller than 50% by weight, preferably smaller than 30% by weight, particularly preferably smaller than 20% by weight, based on the weight of the polyisocyanate polyaddition product, preferably of the polyurethane.

The present invention further provides a prepolymer whose structure involves at least one diisocyanate (a) and at least one polyether alcohol (b), where the at least one polyether alcohol (b) comprises the following components:
(b1) aliphatic polyether alcohols whose number-average molar mass is from 300 to 1000 g/mol,
(b2) aliphatic polyether alcohols whose number-average molar mass is from 2000 to 10 000 g/mol, and
(b3) aliphatic polyether alcohols whose number-average molar mass is from 10 000 to 100 000 g/mol.

A feature of the prepolymer of the invention is that it comprises at least one polyether alcohol (b) which features a specific, and in particular a broad, molecular weight distribution. By virtue of the use in the invention of the specific polyether alcohols (b), it is possible to obtain prepolymers which can be used to produce polyurethane elastomers which have little tendency toward creep at high temperatures of up to 150° C., and have improved low-temperature flexibility and good mechanical and dynamic properties. Especially if naphthylene 1,5-diisocyanate (NDI) is used as diisocyanate (a), it is possible to obtain prepolymers, and, from these, polyurethane elastomers which when compared with other cellular and compact polyurethane elastomers have little tendency toward creep at high temperatures, and have improved low-temperature flexibility and good mechanical and dynamic properties, and which also have excellent hydrolysis resistance.

The prepolymer of the invention is composed of at least one diisocyanate (a) and of at least one polyether alcohol (b).

The diisocyanate (a) used can generally comprise any of the diisocyanates known to the person skilled in the art and suitable for use in polyurethane elastomers. In one preferred embodiment of the present invention, the at least one diisocyanate (a) is an aromatic diisocyanate, and it is particularly preferable that the diisocyanate (a) has been selected from the group consisting of diphenylmethane 2,2'-diisocyanate, diphenylmethane 4,4'-diisocyanate (MDI), naphthylene 1,5-diisocyanate (NDI), tolidine diisocyanate (TODI), and mixtures thereof, particularly preferably naphthylene 1,5-diisocyanate (NDI), tolidine diisocyanate (TODI), and mixtures thereof, and very particularly preferably naphthylene 1,5-diisocyanate (NDI). The isocyanates can be used in the form of the pure compound, or in a mixture and/or in a modified form, for example in the form of uretdiones, isocyanurates, allophanates, or biurets, and preferably in the form of reaction products comprising urethane groups and isocyanate groups, these products being known as isocyanate prepolymers.

The diisocyanates used in the invention can be produced by processes known to the person skilled in the art or, at least in some cases, are commercially available.

The prepolymer of the invention is composed of, alongside the at least one diisocyanate (a), at least one polyether alcohol (b) which comprises the following components:
(b1) aliphatic polyether alcohols whose number-average molar mass is from 300 to 1000 g/mol,
(b2) aliphatic polyether alcohols whose number-average molar mass is from 2000 to 10 000 g/mol, and
(b3) aliphatic polyether alcohols whose number-average molar mass is from 10 000 to 100 000 g/mol.

In one preferred embodiment, the prepolymer of the invention comprises at least 12% by weight, particularly preferably at least 12.5% by weight, very particularly preferably from 12.5 to 25% by weight, of component (b1), at least 35% by weight, particularly preferably at least 35.5% by weight, very particularly preferably from 35.5 to 55% by weight, of component (b2), and at least 4% by weight, particularly preferably from 5 to 8% by weight, of component (b3), where the weight data are in each case based on the total weight of the polyether alcohols, preferably of component (b). The polyether alcohol mixture of the invention can moreover comprise an amount which is preferably from 15 to 35% by weight of a corresponding polymeric compound whose number-average molar mass is from 1000 to 2000 g/mol. It is preferable that the individual molecular weight fractions mentioned give a total of 100% by weight, i.e. in one preferred embodiment there are no further compounds in component (b) alongside polyether alcohols with various number-average molecular weights.

The polyether alcohol (b) used in the invention has the abovementioned very specific distribution of various number-average molecular weights, and in particular this distribution is very broad, i.e. alongside polyether alcohols with low number-average molecular weight there are also polyether alcohols present with very high number-average molecular weights. Surprisingly, this broad molecular weight distribution leads to the advantages of the prepolymers in the invention. By way of example, a result of the broad molecular weight distribution of the polyether alcohol is that, in the polyisocyanate polyaddition product produced from the prepolymer, there is no problematic soft-phase crystallization above −40° C., this type of crystallization otherwise being typical of polyether alcohols with such high molecular weights.

The number-average molecular weight of the polyether alcohols used in the invention can be determined by methods known to the person skilled in the art, for example by gel permeation chromatography (GPC). This method separates a mixture of polyether alcohols with different molecular weights on the basis of their different residence times on a stationary phase. The residence times of the individual fractions are determined and these values are then compared with values determined for a known standard, and the number-average molecular weights can thus be determined.

Compounds that can be used as polyether alcohols (b) comprise those composed of the conventional and well-known structural units, examples being polyether alcohols based on ethylene oxide and/or propylene oxide, produced via alkoxylation of conventional starter substances. The functionality of the polyether alcohols (b) can be from 1.7 to 2.3, the average functionality of the mixture of the polyether alcohols preferably being from 1.8 to 2.2, particularly preferably from 1.9 to 2.1.

In one preferred embodiment, the aliphatic polyether alcohol (b1), (b2), and/or (b3) is polytetrahydrofuran (PTHF). Polytetrahydrofurans are polyols produced by way of example via cationic polymerization starting from tetrahydrofuran. Processes for the production of polytetrahydrofurans are known to the person skilled in the art. Some of these polytetrahydrofurans are also available commercially.

The prepolymer of the invention can particularly preferably comprise allophanate groups. These allophanates can be constructed during prepolymer production via reaction temperatures above 100° C., preferably from 120 to 150° C. Production of the prepolymer can therefore preferably involve addition of NDI flakes to an initial charge of the polyether alcohols (b) heated to 140° C.

It is particularly preferable that the prepolymer of the invention is composed of a diisocyanate (a) selected from the group consisting of naphthylene 1,5-diisocyanate (NDI), tolidine diisocyanate (TODI), and mixtures thereof, in particular naphthylene 1,5-diisocyanate (NDI), and polytetrahydrofuran as polyether alcohol (b), where the polytetrahydrofuran comprises the following components:
(b1) at least 12% by weight of polytetrahydrofuran whose number-average molar mass is from 300 to 1000 g/mol,
(b2) at least 35% by weight of polytetrahydrofuran whose number-average molar mass is from 2000 to 10 000 g/mol, and
(b3) at least 4% by weight of polytetrahydrofuran whose number-average molar mass is from 10 000 to 100 000 g/mol,
where polytetrahydrofurans whose number-average molar mass is from 1000 to 2000 g/mol can be present, and the amounts of all of the polytetrahydrofurans present give a total of 100% by weight.

The prepolymer of the invention preferably has low NCO content. In one particularly preferred embodiment, the NCO content of the prepolymer of the invention is at most 10%, particularly preferably from 2 to 8%, very particularly preferably from 4 to 7%. Methods for determining the NCO content of the prepolymer are known to the person skilled in the art, examples being solution-chemistry methods. In these, the prepolymer is dissolved in a suitable solvent, and excess amine is admixed. The amine which has not reacted with the isocyanate is then back-titrated with HCl. The molar amount of isocyanate is calculated from the difference between the molar amounts of amine used and back-titrated.

The viscosity of the prepolymer of the invention is generally from 1000 to 5000 mPas at 80° C., preferably from 2000 to 4000 mPas at 80° C., in each case depending on the NCO content of the prepolymer. The viscosity stated is preferably determined using a rotational viscometer.

Processes for the production of the prepolymer of the invention are known to the person skilled in the art and are described by way of example in EP 0 850 260 and EP 0 854 889. The prepolymer of the invention can be used to produce polyisocyanate polyaddition products, in particular polyurethanes, with the abovementioned advantageous properties.

The present invention therefore also provides a process for the production of a cellular polyisocyanate polyaddition product, preferably a polyurethane, comprising the steps of:
(A) reaction of at least one diisocyanate (a) with at least one polyether alcohol (b), to obtain a prepolymer, and
(B) reaction, in a mold, of the prepolymer obtained in step (A) with at least one crosslinking component comprising water (e), in order to obtain the cellular polyisocyanate polyaddition product,
where the polyether alcohol (b) used in step (A) comprises the following components:
(b1) preferably aliphatic polyether alcohols whose number-average molar mass is from 300 to 1000 g/mol,
(b2) preferably aliphatic polyether alcohols whose number-average molar mass is from 2000 to 10 000 g/mol, and
(b3) preferably aliphatic polyether alcohols whose number-average molar mass is from 10 000 to 100 000 g/mol.

The process of the invention is preferably carried out by using a two-stage process in step (A) to react (a) with (b) to produce a prepolymer having isocyanate groups, and, in step (B), reacting this prepolymer in a mold with a crosslinking agent component comprising sulfated fatty acid ester (d) and water (e), where the prepolymer and/or the crosslinking agent component can comprise polysiloxanes (c) and, if appropriate, catalysts (f), blowing agents (g), and/or additives (h). The crosslinking agent component here can comprise carbodiimide as (h).

The crosslinking agent component therefore preferably also comprises, in addition to the water (e), sulfated fatty acid ester (d), preferably from 0.005 to 1% by weight of sulfated fatty acid ester, based on the weight of the cellular polyisocyanate polyaddition products, preferably of the cellular polyurethanes, and also catalysts (f), and also, if appropriate, polysiloxanes (c), blowing agents (g), and/or auxiliaries (h). The stated amounts in relation to the fatty acid esters are based here on the weight of the sulfated fatty acid esters without water.

Catalysts that can be comprised here in the crosslinking agent component are preferably tin compounds, particularly preferably tin(IV) compounds, particularly preferably di-n-octyltin(IV) bis(2-ethylhexyl thioglycolate) and/or n-octyltin (IV) tris(2-ethylhexyl thioglycolate). The hardening time required could thus be markedly reduced. No comparable effect could be achieved simply by increasing the amount of aminic catalyst. It is particularly preferable that the crosslinking agent component comprises, in addition to the tin compounds, aminic catalysts, in particular tertiary amines, particularly preferably bis(dimethylaminoethyl) ethers, 1,4-diazabicyclo[2.2.2]octane, N,N,N',N'',N''-pentamethyldiethylenediamine, N-methylimidazole, N-propylimidazole, and/or N-(2-dimethylaminoethyl)-N'-piperazine.

Polysiloxanes that can be used comprise well-known compounds, examples being polymethylsiloxanes, polydimethylsiloxanes, and/or polyoxyalkylene-silicone copolymers. By way of example, compounds of the following general structural formula can be used:

where
X: 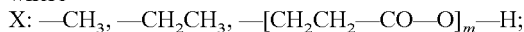
Y: 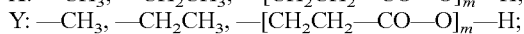
Z: 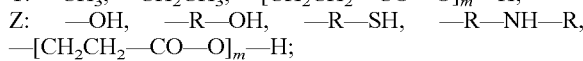
n: 1 to 100;

m: 1 to 100;
R: alkyl, —O-alkyl, —S-alkyl, —NH-alkyl having from 1 to 20 carbon atoms in the alkyl radical.

The viscosity of the polysiloxanes at 25° C. is preferably from 20 to 2000 mPas.

The sulfated fatty acid esters used can comprise well-known sulfated fatty acid esters, which are also available commercially. It is preferable that the sulfated fatty acid ester used comprises sulfated castor oil.

The amount of sulfated fatty acid esters preferably does not exceed the preferred ranges, since in particular no marked improvement in, i.e. reduction in, the water absorption of the moldings is achieved using a relatively large amount of this emulsifier. In the event that further amounts of emulsifier are required by virtue of the use of further compounds in the crosslinking agent component, described below, for example hydrolysis stabilizers, e.g. carbodiimides, for adequate homogenization of said crosslinking agent component, it is possible to exceed the inventive amount of sulfated fatty acid esters, or, by way of example, to use further well-known emulsifiers for complete replacement of the sulfated fatty acid esters, e.g. polyglycol esters of fatty acids, alkoxylates of fatty acids, preferably polyethylene glycol esters, polypropylene glycol esters, polyethylene polypropylene glycol esters, ethoxylates, and/or propoxylates of linoleic acid, linolenic acid, oleic acid, or arachidonic acid, particularly preferably oleic acid ethoxylates.

The sulfated fatty acid esters can preferably be used in the form of aqueous solutions, for example in the form of aqueous solutions of strength 50% by weight.

It is preferable that the cellular polyisocyanate polyaddition products of the invention are produced in a mold at a surface temperature of from 60 to 90° C. for the inner wall of the mold. The term "surface temperature for the inner wall of the mold" here means the temperature of the surface of the inner wall of the mold during the production of the moldings, i.e. that surface of the mold usually in contact with the reaction system during the production of the moldings, for at least a short period, preferably at least 10 min.

The present invention also provides the use of the cellular polyisocyanate polyaddition products of the invention, for example in the form of moldings, as damping elements in vehicle construction, for example in automobile construction, e.g. in the form of ancillary springs, impact absorbers, transverse link bearings, rear-axle subframe bearings, stabilizer bearings, longitudinal link bearings, spring-strut support bearings, shock-absorber bearings, or bearings for triangular links, preferably in the vicinity of hot apparatuses in an automobile or bicycle, for example in the vicinity of the exhaust system, of the engine, or of the transmission system, and/or in the form of an emergency wheel located on the wheel rim and, for example in the event of damage to a tire, permitting the vehicle to run on the cellular polyisocyanate polyaddition product and to remain controllable. It is preferable that the cellular polyisocyanate polyaddition products of the invention are used as damping and mounting elements for elevated usage temperatures in automobile construction, a particularly preferred use being as engine mounting, transmission-system mounting, or exhaust-system mounting, in particular engine mounting or transmission-system mounting.

The moldings of the invention, i.e. the cellular polyisocyanate polyaddition products, preferably the microcellular polyurethane elastomers, therefore have excellent mechanical and dynamic properties, and in addition to these the invention has achieved a desired marked improvement in particular in hydrolysis resistance, microbial resistance, and low-temperature flexibility. In particular, this combination of particularly advantageous properties is not known from the prior art.

The moldings are advantageously produced with an NCO/OH ratio of from 0.85 to 1.20, by mixing the heated starting components and introducing an amount of these corresponding to the desired density of the molding into a heated, preferably leakproof, mold.

The amount of the reaction mixture introduced into the mold is usually judged in such a way that the resultant moldings have the density previously described. The density to DIN EN ISO 845 of the cellular polyisocyanate polyaddition products obtainable in the invention is preferably from 200 to 800 kg/m$^3$, particularly preferably from 300 to 600 kg/m$^3$.

The temperature of the starting components when they are introduced into the mold is usually from 15 to 120° C., preferably from 20 to 100° C. The degrees of compaction for production of the moldings are from 1.1 to 8, preferably from 2 to 6.

The cellular polyisocyanate polyaddition products of the invention are advantageously produced by the one-shot process with the aid of low-pressure technology, or in particular with the aid of reactive injection molding technology (RIM), in open or preferably closed molds. The reaction is in particular carried out with compaction in a closed mold. Reactive injection molding technology is described by way of example by H. Piechota and H. Röhr in "Integralschaumstoffe" [Integral foams], Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76 to 84.

If a mixing chamber is used with a plurality of feed nozzles, the starting components can be introduced individually and intensively mixed in the mixing chamber. It has proven advantageous to use the two-component process.

In one particularly advantageous embodiment, in a two-stage process, a prepolymer containing NCO groups is first produced. For this, components (b) are reacted with (a) in excess, usually at temperatures of from 80° C. to 160° C. The reaction time is judged in such a way as to achieve the theoretical NCO content.

The inventive production of the moldings is therefore preferably carried out in a two-stage process, by using reaction of (a) with (b) to produce, in the first stage, a prepolymer having isocyanate groups, and, in the second stage, reacting this prepolymer in a mold with a crosslinking agent component comprising (d) and (e), where the prepolymer and/or the crosslinking agent component comprises (c) and, if appropriate, (f), (g), and/or (h).

In the two-stage process, component (c) can be added to the prepolymer prior to, during, and/or after its production, and/or to the crosslinking agent component. The crosslinking agent component can preferably comprise the auxiliaries and/or additives (h).

To improve the demolding of the moldings produced in the invention, it has proved advantageous, at least at the beginning of a production run, to use conventional external mold-release agents to coat the inner surfaces of the mold, examples being those based on wax or on silicone, or in particular to use aqueous soap solutions for this purpose.

As a function of the size and geometry of the molding, the demolding times are from 1 to 60 minutes.

After the production of the moldings in the mold, the moldings can preferably be heat-conditioned for a period of from 1 to 48 hours at temperatures which are usually from 70 to 140° C.

The following can be said in relation to the starting components comprised by the reaction mixture of the invention:

In the invention, it is preferable that the process uses the prepolymer of the invention.

In relation to the at least one diisocyanate (a), the statements made above are applicable.

The polyether alcohols (b) used comprise the mixtures described above with broad molecular weight distribution. These can, if appropriate, be used together with well-known polyhydroxy compounds which are not within the inventive definition of component (b), examples being polyester polyalcohols and/or polycarbonates containing hydroxy groups, preferably those whose functionality is from 2 to 3 and preferably whose molecular weight is from 60 to 7000, particularly preferably from 500 to 6000, in particular from 1000 to 6000. It is particularly preferable that component (b) used comprises exclusively the polyetherols of the invention.

In addition to the components previously described and present in the at least one polyether alcohol (b), it is moreover possible to use low-molecular-weight chain extenders (b4) whose molecular weight is smaller than 500, preferably from 60 to 499, where these do not fall within the inventive definition of component (b), examples being those selected from the group of the dihydric alcohols and dihydric polyoxyalkylene polyols. The (b4) used can by way of example comprise alkanediols having from 2 to 12, preferably 2, 4, or 6, carbon atoms, examples being ethane-, 1,3-propane-, 1,5-pentane-, 1,6-hexane-, 1,7-heptane-, 1,8-octane-, 1,9-nonane-, and 1,10-decane-diol, and preferably 1,4-butanediol, dialkylene glycols having from 4 to 8 carbon atoms, e.g. diethylene glycol and dipropylene glycol, and/or dihydric polyoxyalkylene polyols. It is moreover possible to use alkyl-substituted aromatic polyamines whose molecular weights are preferably from 122 to 400, in particular primary aromatic diamines which have at least one alkyl substituent in ortho-position with respect to the amino groups, where this substituent reduces the reactivity of the amino group via steric hindrance, these compounds being liquid at room temperature and, under the conditions of processing, being at least partially, preferably completely, miscible with the relatively high-molecular-weight, preferably at least dihydric compounds (b). Compounds that can be used for production of the moldings of the invention comprise the following compounds which are readily obtainable industrially: 1,3,5-triethyl-2,4-phenylenediamine, 1-methyl-3,5-diethyl-2,4-phenylenediamine, mixtures composed of 1-methyl-3,5-diethyl-2,4- and -2,6-phenylenediamines, known as DETDA, isomer mixtures composed of 3,3'-dialkyl- or 3,3',5,5'-tetraalkyl-substituted 4,4'-diaminodiphenylmethanes having from 1 to 4 carbon atoms in the alkyl radical, in particular 3,3',5,5'-tetraalkyl-substituted 4,4'-diaminodiphenylmethanes comprising methyl, ethyl, and isopropyl radicals, and also mixtures composed of the tetraalkyl-substituted 4,4'-diaminodiphenylmethanes mentioned and DETDA. In order to achieve specific mechanical properties, it can also be advantageous that the alkyl-substituted aromatic polyamines are used in a mixture with the abovementioned low-molecular-weight polyhydric alcohols, preferably di- and/or trihydric alcohols, or dialkylene glycols.

In the invention, the cellular polyisocyanate polyaddition products are produced in the presence of water (e). The water acts not only as crosslinking agent to form urea groups but also as blowing agent, by virtue of the reaction with isocyanate groups to form carbon dioxide. Because of this double function, it is listed separately from (b) and (g) in this specification. By definition, therefore, components (b) and (g) comprise no water, which by definition is listed exclusively as (e).

The amounts of water which can be used advantageously are from 0.01 to 5% by weight, preferably from 0.3 to 3.0% by weight, based on the weight of component (b). The water can be used completely or partially in the form of the aqueous solutions of the sulfated fatty acid ester.

To accelerate the reaction, well-known catalysts (f) can be added to the reaction mixture during the reaction of a prepolymer with a crosslinking agent component. The catalysts (f) can be added individually or else in a mixture with one another. The preferred catalysts have been described above. These can, if appropriate, be used together with other well-known catalysts, e.g. organometallic compounds, such as stannous salts of carboxylic acids, e.g. stannous dioctoate, stannous dilaurate, dibutyltin diacetate, and dibutyltin dilaurate, and with tertiary amines, such as tetramethylethylenediamine, N-methylmorpholine, diethylbenzylamine, triethylamine, dimethylcyclohexylamine, diazabicyclooctane, N,N'-dimethylpiperazine, N-methyl-N'-4-dimethylaminobutylpiperazine, N,N,N',N'',N''-pentamethyldiethylenediamine, or the like. Other catalysts that can be used are: amidines, e.g. 2,3-dimethyl-3,4,5,6-tetra-hydropyrimidine, tris(dialkylaminoalkyl)-s-hexahydrotriazines, in particular tris(N,N-di-methylaminopropyl)-s-hexahydrotriazine, tetraalkylammonium hydroxides, e.g. tetra-methylammonium hydroxide, alkali metal hydroxides, e.g. sodium hydroxide, and alkali metal alcoholates, e.g. sodium methoxide and potassium isopropoxide, and also alkali metal salts of long-chain fatty acids having from 10 to 20 carbon atoms and, if appropriate, having pendant OH groups.

The amounts used of the catalysts (f) are, as a function of the reactivity desired, from 0.0001 to 0.5% by weight, based on the prepolymer.

Production of the polyurethane can, if appropriate, use conventional blowing agents (g). Examples of those suitable are low-boiling-point liquids which vaporize when exposed to the exothermic polyaddition reaction. Suitable liquids are those inert toward the organic polyisocyanate and having boiling points below 100° C. Examples of these liquids whose use is preferred are halogenated, preferably fluorinated, hydrocarbons, e.g. methylene chloride and dichloromonofluoromethane, perfluorinated or partially fluorinated hydrocarbons, e.g. trifluoromethane, difluoromethane, difluoroethane, tetrafluoroethane, and heptafluoropropane, hydrocarbons, e.g. n- and isobutane, and n- and isopentane, and also the industrial mixtures of these hydrocarbons, propane, propylene, hexane, heptane, cyclobutane, cyclopentane, and cyclohexane, dialkyl ethers, e.g. dimethyl ether, diethyl ether, and furan, carboxylic esters, such as methyl and ethyl formate, ketones, e.g. acetone, and/or fluorinated and/or perfluorinated tertiary alkylamines, e.g. perfluorodimethylisopropylamine. Mixtures of these low-boiling-point liquids with one another and/or with other substituted or unsubstituted hydrocarbons can also be used.

The most advantageous amount of low-boiling-point liquid for the production of these cellular elastic moldings composed of elastomers comprising urea groups depends on the desired density, and also on the amount of the water preferably used concomitantly. Amounts of from 1 to 15% by weight, preferably from 2 to 11% by weight, based on the weight of component (b) generally provide satisfactory results. It is particularly preferable to use exclusively water (e) as blowing agent.

Auxiliaries and additives (h) can be used when the moldings are produced in the invention. Among these are by way of example well-known surfactants, hydrolysis stabilizers, fillers, antioxidants, cell regulators, flame retardants, and also dyes. The surfactant substances that can be used comprise compounds which serve to promote homogenization of the starting materials and, if appropriate, are also suitable to regulate cell structure. Compounds which may be mentioned by way of example are compounds which have emulsifying action and which are additional to the emulsifiers of the invention, examples being the salts of fatty acids with amines, e.g. diethylamine oleate, diethanolamine stearate, diethanolamine ricinoleate, salts of sulfonic acids, e.g. the alkali metal or ammonium salts of dodecylbenzene- or dinaphthylmethanedisulfonic acid. Foam stabilizers can also be used, examples being ethoxylated alkylphenols, ethoxylated fatty alcohols, paraffin oils, castor oil esters or ricinoleic esters, Turkey red oil and peanut oil, and cell regulators, such as paraffins and fatty alcohols. The amounts usually used of the surfactants are from 0.01 to 5 parts by weight, based on 100 parts by weight of components (b). The compounds (c) and (d) are by definition not among the auxiliaries and additives (h).

The present invention also provides a cellular polyisocyanate polyaddition product, preferably a polyurethane elastomer, which can be produced by the process of the invention.

FIG. 1 shows a molding of the invention, produced from the polyurethane elastomer of the invention.

The examples below are intended to provide further explanation of the invention.

EXAMPLES

The following polytetrahydrofuran (PTHF) fractions were used:

| | |
|---|---|
| PTHF from a number-average molar mass range from 300 to 1000 g/mol, its number-average molar mass being 595 g/mol | PTHF I |
| PTHF from a number-average molar mass range from 1000 to 2000 g/mol, its number-average molar mass being 1430 g/mol | PTHF II |
| PTHF from a number-average molar mass range from 2000 to 10 000 g/mol, its number-average molar mass being 3600 g/mol | PTHF III |
| PTHF from a number-average molar mass range from 10 000 to 100 000 g/mol, its number-average molar mass being 14 450 g/mol | PTHF IV |

Production of Components

Example 1 (of the Invention)

1) Production of Prepolymer Containing NCO Groups 12.8% by weight of a polytetrahydrofuran I, 18.9% by weight of a polytetrahydrofuran II, 37.8% by weight of a polytetrahydrofuran III, 6% by weight of a polytetrahydrofuran IV, and 2 ppm of citric acid were heated to 140° C. under nitrogen in a tinplate bucket and 24.5% by weight of naphthylene 1,5-diisocyanate (NDI) were admixed, with stirring.

The reaction temperature was kept for at least 15 min at above 140° C., to complete the reaction, and the mixture was then cooled. This gave an almost colorless liquid whose NCO content was 5.6%.

2) Production of Crosslinking Agent Component Via Mixing of the Following Components:

36.02% by weight of 50% strength aqueous solution of a fatty acid sulfate
19.91% by weight of polyglycol ester of ricinoleic acid
4.58% by weight of fatty-acid-ester-based emulsifier mixture
18.01% by weight of demineralized water
20.63% by weight of carbodiimide
0.79% by weight of amine catalyst 3) Production of the Moldings 97.0% by weight of the prepolymer of (1), whose temperature was 90° C., were mixed with 3.0% by weight of the crosslinking agent component of (2), whose temperature was 50° C. 75 g of the mixture were introduced into a sealable mold whose temperature had been controlled to 85° C. and which had the shape of a spring of FIG. 1, and the foam was hardened at 85° C. Slabs were also foamed. The microcellular product was demolded and the molding was then subjected to thermal postcuring.

Example 2 (of the Invention)

1) Production of Prepolymer Containing NCO Groups 12.1% by weight of a polytetrahydrofuran I, 17.9% by weight of a polytetrahydrofuran II, 35.7% by weight of a polytetrahydrofuran III, 5.8% by weight of a polytetrahydrofuran IV and 2 ppm of citric acid were heated to 140° C. under nitrogen in a tinplate bucket and 28.6 parts by weight of naphthylene 1,5-diisocyanate (NDI) were admixed, with stirring. The reaction temperature was kept for 16 min at above 130° C., to complete the reaction, and the mixture was then cooled. This gave an almost colorless liquid whose NCO content was 7.4%.

2) Production of the Crosslinking Agent Component: See Example 1

3) Production of the Moldings 96.0% by weight of the prepolymer of (1), whose temperature was 90° C., were mixed with 4.0% by weight of the crosslinking agent component of (2), whose temperature was 50° C. 75 g of the mixture were introduced into a sealable mold whose temperature had been controlled to 85° C. and which had the shape of a spring of FIG. 1, and the foam was hardened at 85° C. Slabs were also foamed. The microcellular product was demolded and the molding was then subjected to thermal postcuring.

Example 3 (of the Invention)

1) Production of Prepolymer Containing NCO Groups 12.8% by weight of a polytetrahydrofuran I, 18.8% by weight of a polytetrahydrofuran II, 37.6% by weight of a polytetrahydrofuran III, 6% by weight of a polytetrahydrofuran IV, and 2 ppm of citric acid were heated to 140° C. under nitrogen in a tinplate bucket and 24.8% by weight of naphthylene 1,5-diisocyanate (NDI) were admixed, with stirring. The reaction temperature was kept for 30 min at above 140° C., to complete the reaction, and the mixture was then cooled. This gave an almost colorless liquid whose NCO content was 5.4%.

2) Production of the Crosslinking Agent Component: see Example 1

3) Production of the Moldings 97.0% by weight of the prepolymer of (1), whose temperature was 90° C., were mixed with 3.0% by weight of the crosslinking agent component of (2), whose temperature was 50° C. 75 g of the mixture were introduced into a sealable mold whose temperature had been controlled to 85° C. and which had the shape of a spring of FIG. 1, and the foam was hardened at 85° C. Slabs were also foamed. The density of the moldings was varied in the range from 300 g/l up to 650 g/l. The microcellular product was demolded and the molding was then subjected to thermal postcuring.

Example 4 (of the Invention)

1) Production of Prepolymer Containing NCO Groups 12.6% by weight of a polytetrahydrofuran I, 18.5% by weight of a polytetrahydrofuran II, 37.0% by weight of a polytetrahydrofuran III, 6% by weight of a polytetrahydrofuran IV were heated to 140° C. under nitrogen in a tinplate bucket and 1.3% by weight of a trimerized hexamethylene diisocyanate and 24.6% by weight of naphthylene 1,5-diisocyanate were admixed, with stirring. The reaction temperature was kept for 28 min at above 140° C., to complete the reaction, and the mixture was then cooled. This gave an almost colorless liquid whose NCO content was 5.93%.

2) Production of the Crosslinking Agent Component: see Example 1

3) Production of the Moldings 97.0% by weight of the prepolymer of (1), whose temperature was 90° C., were mixed with 3.0% by weight of the crosslinking agent component of (2), whose temperature was 50° C. 75 g of the mixture were introduced into a sealable mold whose temperature had been controlled to 85° C. and which had the shape of a spring of FIG. 1, and the foam was hardened at 85° C. Slabs were also foamed. The microcellular product was demolded and the molding was then subjected to thermal postcuring.

Example 5 (of the Invention)

1) Production of Prepolymer Containing NCO Groups 13.0% by weight of a polytetrahydrofuran I, 19.0% by weight of a polytetrahydrofuran II, 38.2% by weight of a polytetrahydrofuran III, 6.1% by weight of a polytetrahydrofuran IV and 2 ppm of citric acid were heated to 140° C. under nitrogen in a tinplate bucket and 23.7% by weight of naphthylene 1,5-diisocyanate (NDI) were admixed, with stirring. The reaction temperature was kept for 10 min at above 140° C., to complete the reaction, and the mixture was then cooled. This gave an almost colorless liquid whose NCO content was 5.46%.

2) Production of the Crosslinking Agent Component: see Example 1

3) Production of the Moldings 97.0% by weight of the prepolymer of (1), whose temperature was 90° C., were mixed with 3.0% by weight of the crosslinking agent component of (2), whose temperature was 50° C. 75 g of the mixture were introduced into a sealable mold whose temperature had been controlled to 85° C. and which had the shape of a spring of FIG. 1, and the foam was hardened at 85° C. Slabs were also foamed. The microcellular product was demolded and the molding was then subjected to thermal postcuring.

Example 6 (of the Invention)

1) Production of Prepolymer Containing NCO Groups 12.0% by weight of a polytetrahydrofuran I, 17.5% by weight of a polytetrahydrofuran II, 35.2% by weight of a polytetrahydrofuran III, 5.6% by weight of a polytetrahydrofuran IV, 4.9% by weight of a polyether polyol based on glycerol, propylene oxide, and ethylene oxide whose average molecular weight was 5270 and whose average functionality was 2.5 and 2 ppm of citric acid were heated to 140° C. under nitrogen in a tinplate bucket and 24.7% by weight of naphthylene 1,5-diisocyanate (NDI) were admixed, with stirring. The reaction temperature was kept for 25 min at above 140° C., to complete the reaction, and the mixture was then cooled. This gave an almost colorless liquid whose NCO content was 6.09%.

2) Production of the Crosslinking Agent Component: see Example 1

3) Production of the Moldings 97.0% by weight of the prepolymer of (1), whose temperature was 90° C., were mixed with 3.0% by weight of the crosslinking agent component of (2), whose temperature was 50° C. 75 g of the mixture were introduced into a sealable mold whose temperature had been controlled to 85° C. and which had the shape of a spring of FIG. 1, and the foam was hardened at 85° C. Slabs were also foamed. The microcellular product was demolded and the molding was then subjected to thermal postcuring.

Properties of the Foams of the Examples of the Invention and of the Comparative Examples The foams of the invention combine improved resistance to high temperatures with very good hydrolysis resistance, permitting long periods of use of the material even in adverse environments. There is no loss here of the characteristic good dynamic properties of the novel material.

The dynamic properties of the material are determined on the spring element shown in FIG. 1. When the spring elements of the invention from examples 1, 2, 4, and 6 are subjected to the dynamic test the resultant values for setting effect were low and therefore advantageous.

The table below collates the properties of the cellular elastomers of the invention (examples 1 to 6). Static mechanical properties were determined from the slabs, and dynamic mechanical properties were determined from the spring elements (see FIG. 1).

TABLE 1

|  | Unit | 1 | 2 | 3.1 350 g/l | 3.2 500 g/l | 3.3 650 g/l | 4 | 5 | 6 | Test method |
|---|---|---|---|---|---|---|---|---|---|---|
| TMA |  |  |  |  |  |  |  |  |  | based on ISO 11359-3 *(see below) |
| 1N test load | ° C. | 221.8 | 244.5 | 212.0 | 225.0 | 231.5 | 237.0 | 238.0 | 231.5 |  |
| Compression set |  |  |  |  |  |  |  |  |  | DIN EN ISO 1856 |
| 80° C. 40% 22 + 2 h | % | 18.3 | 26.5 | 13.9 | — | — | 18.1 | 18.4 | 15.5 |  |
| 100° C. 40% 22 + 2 h | % | 29.9 | 41.1 | 26.8 | — | — | 31.2 | 29.6 | 25.5 |  |
| 120° C. 40% 22 + 2 h | % | 84.6 | 87.0 | 58.4 | — | — | 91.8 | 83.2 | 81.2 |  |
| 140° C. 40% 22 + 2 h | % | 97.1 | 97.4 | 98.1 | — | — | — | 97.6 | 96.5 |  |
| Creep test |  |  |  |  |  |  |  |  |  | **(see below) |
| 130° C. 24 h 2 kg/cm$^2$ | % | 0.5 | 0.3 | — | — | — | −0.8 | 1.5 | −1.0 |  |
| 150° C. 24 h 2 kg/cm$^2$ | % | −2.9 | −0.5 | −9.8 | −5.6 | −4.2 | −4.1 | −3.4 | −6.4 |  |
| Dynamic mechanical properties |  |  |  |  |  |  |  |  |  | DIN EN ISO 6721-1 ***(see below) |

TABLE 1-continued

| | Unit | 1 | 2 | 3.1 350 g/l | 3.2 500 g/l | 3.3 650 g/l | 4 | 5 | 6 | Test method |
|---|---|---|---|---|---|---|---|---|---|---|
| Tg | °C. | −73.4 | −73.3 | −73.3 | −73.5 | −73.4 | −73.3 | −73.6 | −68.3 | |
| Softening point | °C. | 172 | 180 | 160 | 168 | 168 | 170 | 175 | 180 | |
| Dynamic properties | | | | | | | | | | |
| Characteristic | mm | 60.5 | 55 | 73.4 | 61.2 | 54.2 | 62.3 | 59.4 | 61.6 | ****(see below) |
| Load cycles | number | 100000 | 100000 | — | — | — | — | 100000 | 100000 | *****(see below) |
| SV | % | 7.3 | 11.7 | — | — | — | — | 8.5 | 7 | |
| Increase in displacement | mm | 1.3 | 1.6 | — | — | — | — | 1.6 | 1 | |
| Max. damping | % | 10.8 | 15.2 | — | — | — | — | 13.7 | 10.7 | |
| Tmax | °C. | 78 | 88 | — | — | — | — | 88 | 84 | |

— no values available

*The test specimen (d = 8 mm, h = 2 mm) is subjected to a load of 1N; the result is the 1st temperature value at which the specimen height falls below 100%;

**The cubic test specimen (edge length = 30 mm) is subjected to a constant load of 18 kg/9 cm$^2$ and stored at 130° C. and, respectively, 150° C.; result = percentage deformation, based on initial height

***In the torsion test, the storage modulus of the test specimen (40 mm x 12 mm x 2 mm) is studied in the temperature range from −80° C. to 280° C. (torsion frequency 1 Hz).

****Characteristic: spring displacement for standard test spring of FIG. 1 using a compressive force of 6 kN.

*****Dynamic test conditions: 6 kN load; 1.2 Hz frequency; 100 000 load cycles; no fan cooling; percentage value for setting effect (SV) is calculated from the percentage ratio of the residual height of the spring after the test (HR) to the initial height H0 of the spring prior to the test: SV = [(H0 − HR)/H0] * 100[%]

Resistance to High Temperatures:

Test conditions: The test specimen was subjected to a constant load of 0.2 kg/cm$^2$ and heated to 300° C. The values stated in table 3 are the temperatures at which the specimens fall below their initial height, i.e. they are the temperatures at which the materials lose mechanical stability.

The naphthylene 1,5-diisocyanate-based PTHF materials of the invention (examples 1, 2, 4) exhibit very good thermomechanical analysis results.

TABLE 3

| Resistance to high temperatures | | |
|---|---|---|
| Example 1 | Example 2 | Example 4 |
| 245° C. | 237° C. | 222° C. |

The invention claimed is:

1. A process, comprising:
   (A) reacting naphthylene 1,5-diisocyanate (NDI) (a) with a polyether alcohol (b), to obtain a prepolymer, and
   (B) reacting, in a mold, the prepolymer obtained in said reacting (A) with a crosslinking component comprising water,
   to obtain a cellular polyisocyanate polyaddition product,
      where the polyether alcohol present in the reacting (A) comprises three different aliphatic polyether alcohols:
      (b1) an aliphatic polyether alcohol having a number-average molar mass of from 300 to 1000 g/mol,
      (b2) polytetrahydrofuran whose number-average molar mass is from 2000 to 10,000 g/mol, and
      (b3) an aliphatic polyether alcohol having a number-average molar mass of from 10,000 to 100,000 g/mol.

2. The process of claim 1, wherein a density of the cellular polyisocyanate polyaddition product according to DIN EN ISO 845 is from 200 to 800 kg/m$^3$.

3. The process of claim 1, wherein aliphatic polyether alcohol (b3) is present in the cellular polyisocyanate in an amount of at least 4% by weight, based on a total weight of the cellular polyisocyanate polyaddition product.

4. The process of claim 1, wherein the cellular polyisocyanate polyaddition product exhibits creep of less than 10% when kept for 24 h at 150° C., using a test load of 2 kg/cm$^2$.

5. The process of claim 1, wherein the cellular polyisocyanate polyaddition product has:
   a tensile strength according to DIN EN ISO 1798 of >2 N/mm$^2$,
   a tensile strain at break according to DIN EN ISO 1798 of ≥200%, and
   a tear-propagation resistance according to DIN ISO 34-1B (b) of ≥6 N/mm.

6. The process of claim 1, wherein the prepolymer comprises at least 12% by weight of component (b1), at least 35% by weight of component (b2), and at least 4% by weight of component (b3), in each case based on the total weight of the polyether alcohols.

7. The process of claim 1, wherein the prepolymer has NCO content smaller than 10%.

8. The process of claim 1, wherein the cellular polyisocyanate polyaddition product has:
   a tensile strength according to DIN EN ISO 1798 of >4 N/mm$^2$,
   a tensile strain at break according to DIN EN ISO 1798 of ≥230%, and
   a tear-propagation resistance according to DIN ISO 34-1B (b) of ≥10 N/mm.

9. The process of claim 1, wherein the cellular polyisocyanate polyaddition product has a water absorption of less than 50% by weight, based on the weight of the cellular polyisocyanate polyaddition product.

10. The process of claim 1, wherein the polyether alcohol present in the reacting (A) comprises at least one polyether alcohol (b1), at least one polyether alcohol (b2), at least one polyether alcohol (b3), and at least one polyether alcohol having a number-average molar mass of from greater than 1000 and less than 2000 g/mol.

11. The process of claim 1, wherein the average functionality of the polyether alcohols (b) is from 1.7 to 2.3.

12. The process of claim 1, wherein reacting the NDI (a) with the polyether alcohol (b) to obtain a prepolymer comprises reacting at a temperature above 100° C., and wherein the prepolymer comprises an allophanate group.

13. The process of claim 1, wherein each of polyether alcohols (b1), (b2), and (b3) comprise polytetrahydrofuran.

14. The process of claim 1, wherein the prepolymer has a viscosity of from 1000 to 5000 mPas at 80° C.

15. The process of claim 1, wherein the crosslinking component comprises a sulfated fatty acid ester.

16. The process of claim 15, wherein a content of the sulfated fatty acid ester is from 0.005 to 1% by weight, based on the total weight of the cellular polyisocyanate polyaddition product.

17. The process of claim 1, wherein the crosslinking component comprises a tin(IV) compound as a catalyst.

18. The process of claim 1, wherein, in (B) reacting the prepolymer in the mold, a surface temperature of an inner wall of the mold is from 60 to 90° C. for at least a portion of the reacting.

* * * * *